April 8, 1930.  A. V. BEDFORD  1,754,187

BELT OR STRIP DRIVING ARRANGEMENT

Filed Nov. 3, 1927

Inventor
Alda V. Bedford,
by *Alexander S. Lent*
His Attorney.

Patented Apr. 8, 1930

1,754,187

UNITED STATES PATENT OFFICE

ALDA V. BEDFORD, OF SCHENECTADY, NEW YORK, ASSIGNOR TO GENERAL ELECTRIC COMPANY, A CORPORATION OF NEW YORK

BELT OR STRIP DRIVING ARRANGEMENT

Application filed November 3, 1927. Serial No. 230,864.

My invention relates to driving mechanism for a belt or strip of the character in which the belt or strip is engaged consecutively by each of a plurality of driving members one of which is a roller. In the case where the belt or strip is a film such as a motion picture film having a sound record thereon and driven by both a sprocket and by a roller or drum, it is found that unless slippage occurs between the film and the roller, which is undesirable, the two drives will not continue to pass the film at exactly the same rate even though they are constructed theoretically to do so. This is largely due to shrinkage irregularities of the film and it results in the loop of film between the sprocket and the roller continuously either enlarging or diminishing in size as the case may be. An object of my invention is the provision of an improved driving arrangement for a belt or strip which shall avoid the difficulties such as those aforementioned and in which the speed of the belt or strip as driven by the roller shall vary automatically thereby to equal the speed at which it is driven by the other driving member.

My invention will be better understood from the following description taken in connection with the accompanying drawing, and its scope will be pointed out in the appended claims.

Figure 1:
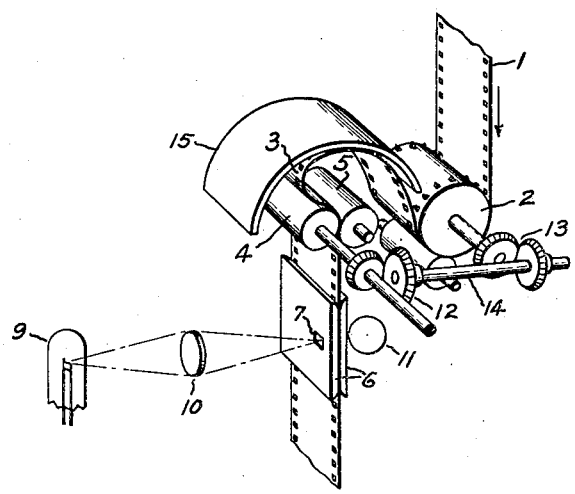
Figure 2:
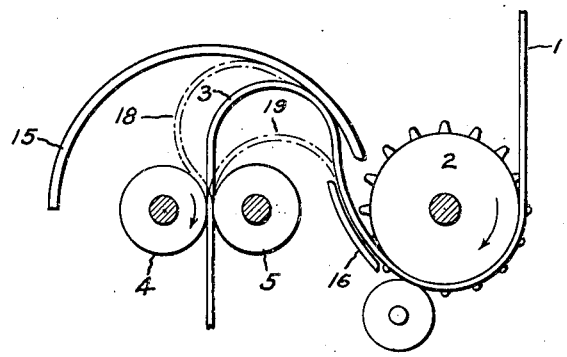

Referring to the drawing, Fig. 1 is a perspective view of an arrangement involving my invention and Fig. 2 is a detail thereof drawn to a larger scale.

I have chosen to illustrate my invention as driving a photographic film adapted to have motion picture and sound records formed thereon. It may be assumed that the film 1 is being drawn by the sprocket 2 from the unwinding reel, not shown, and from the sprocket it passes into the loop 3 to the driving roller 4 against which it is firmly pressed by the idler 5 to avoid slippage. From the rollers the film passes down through the guides 6 having the openings 7 in one of which is a narrow transverse light aperture. Light from the source 9 is concentrated on the opening 7 by the lens 10 and behind the rear guide 6 is the photo-electric cell 11, the sound record on the film governing the amount of light which reaches the cell. From the guides 6 the film may proceed to the winding reel if only the sound is to be reproduced or to a picture projector if both the pictures and the sounds are to be given. The sprocket and the roller 4 are shown connected together by gearing comprising the two pairs of bevel gears 12 and 13 and the counter shaft 14 and are driven at substantially constant speed by a common driving member, not shown. I have shown the curved guide 15 for cooperating with the film loop to assist in causing the loop to bend over the roller 4 when it becomes sufficiently large but its use is not essential and it may be dispensed with if desired. I have also shown the guide 16 which assists in directing the film and prevents it from buckling.

The sprocket 2, the roller 4 and the connecting gearing are so constructed that they will normally drive the film at approximately the same linear speed when the film enters the rollers straight as shown by the full lines in Fig. 2. As the driving proceeds the loop inevitably will grow either larger or smaller, it being obvious that shrinkage of the film will cause the loop gradually to decrease in size and an elongation of the film will cause the loop gradually to enlarge. When the film enters the rollers without bending as shown in full lines on Fig. 2, its linear velocity equals that of the face of driving roller 4. When the loop increases in size the film as it approaches the point of contact with roller 4 bends over that roller as shown for example by the dotted line position 18. The neutral axis of that portion of the film engaging the roller 4 now moves in the arc of a circle whose radius is greater than the radius of the roller face by an amount equal to one half the thickness of the film, hence the linear velocity of the film as moved by the roller is increased. The resulting increase in linear velocity of the film reduces the size of the loop until it approaches or reaches the full line position. The effect of the bending of the film as it engages the roller 4 possibly may be more clearly understood by thinking of the film as having its roller engaging surface lengthened or shortened as a result of being bent prior to being engaged between the rollers. When the loop decreases in size below that shown in full lines, for example, to that shown in the dotted line position 19, the opposite effect is produced resulting in a decrease in speed of the film as moved by the roller 4. It is to be understood that the variation in speed due to changes in size of the loop is indeed very small, particularly in the case of a very thin belt or strip such as a motion picture film but it has been found to be sufficient to effect automatic compensation for differences in the driving speeds of the sprocket and the roller due to ordinary variations in film length.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Driving apparatus for a belt or strip comprising a driving roller therefor, a member arranged to press the belt or strip against the driving roller, a second driving member for the belt or strip arranged to feed the same into a loop from which it passes to the driving roller, and means adapted to vary with variations in the size of the loop the curvature of the belt or strip as it reaches the roller.

2. Film driving apparatus comprising a driving roller, a member adapted to press the film thereagainst, a sprocket having a driving connection with the roller and arranged to feed the film into a variable loop from which it passes to the roller, the size of the loop varying the flexure of the film toward or away from the roller where the film is caused to engage the roller.

3. Driving apparatus for a film comprising a driving roller, a roller arranged to press the film against the driving roller, and a sprocket adapted to engage the film and move it into a loop of variable size from which it passes to said rollers, the curvature of the film as it reaches the point of contact with the two rollers being governed by the size of the loop.

4. Film driving apparatus comprising a driving sprocket and a driving roller each engaging the film and connected to be driven from a common source, and a second roller adapted to press the film against the driving roller, the parts being so located with respect to one another that the film passes from the sprocket to the point of engagement of the two rollers through a variable loop whose size controls the curvature of the film as it reaches said point.

5. Film driving apparatus comprising a sprocket, a driving roller, an idler for pressing the film against the roller, a common driving connection to said sprocket and roller, the parts being so located with respect to one another that the film passes from the sprocket through a loop to the point of contact therewith of the roller and idler, and a guide adapted to assist in flexing the film relative to the roller when it reaches the point of engagement with the roller and idler.

In witness whereof, I have hereunto set my hand this 2nd day of November, 1927.

ALDA V. BEDFORD.